(12) United States Patent
Kotik et al.

(10) Patent No.: US 9,780,381 B2
(45) Date of Patent: Oct. 3, 2017

(54) CURRENT COLLECTORS

(71) Applicants: Bosch Battery Systems, LLC, Orion, MI (US); Robert Bosch GmbH, Stuttgart (DE)

(72) Inventors: Mark Kotik, Rochester Hills, MI (US); Mehul Botadra, Sterling Heights, MI (US)

(73) Assignees: Bosch Battery Systems, LLC, Orion, MI (US); Robert Bosch GmbH, Stuttgart (DE)

( * ) Notice: Subject to any disclaimer, the term of this patent is extended or adjusted under 35 U.S.C. 154(b) by 100 days.

(21) Appl. No.: 15/002,700

(22) Filed: Jan. 21, 2016

(65) Prior Publication Data

US 2017/0214057 A1 Jul. 27, 2017

(51) Int. Cl.
*H01M 10/052* (2010.01)
*H01M 4/78* (2006.01)
*H01M 2/24* (2006.01)
*H01M 10/04* (2006.01)

(52) U.S. Cl.
CPC ............... *H01M 4/78* (2013.01); *H01M 2/24* (2013.01); *H01M 10/0431* (2013.01)

(58) Field of Classification Search
CPC ................. H01M 10/052; H01M 10/0525
See application file for complete search history.

(56) References Cited

U.S. PATENT DOCUMENTS

| | | |
|---|---|---|
| 6,818,025 B1 | 11/2004 | Ura |
| 7,736,795 B2 | 6/2010 | Sakamoto et al. |
| 8,574,753 B2 | 11/2013 | Ishii et al. |
| 2014/0199562 A1 | 7/2014 | Kim et al. |

*Primary Examiner* — Olatunji Godo
(74) *Attorney, Agent, or Firm* — Kelly McGlashen; Maginot Moore & Beck LLP

(57) ABSTRACT

An electrochemical cell includes an electrode assembly disposed in a cell housing. A first U-shaped current collector is disposed between the cell housing and the electrode assembly, and is electrically connected to a positive electrode portion of the electrode assembly. A second U-shaped current collector is disposed between the cell housing and the electrode assembly, and is electrically connected to a negative electrode portion of the electrode assembly. The first and second current collectors cooperate to surround all sides of the electrode assembly and to retain the electrode assembly in the desired configuration without requiring a separate restraint.

20 Claims, 11 Drawing Sheets

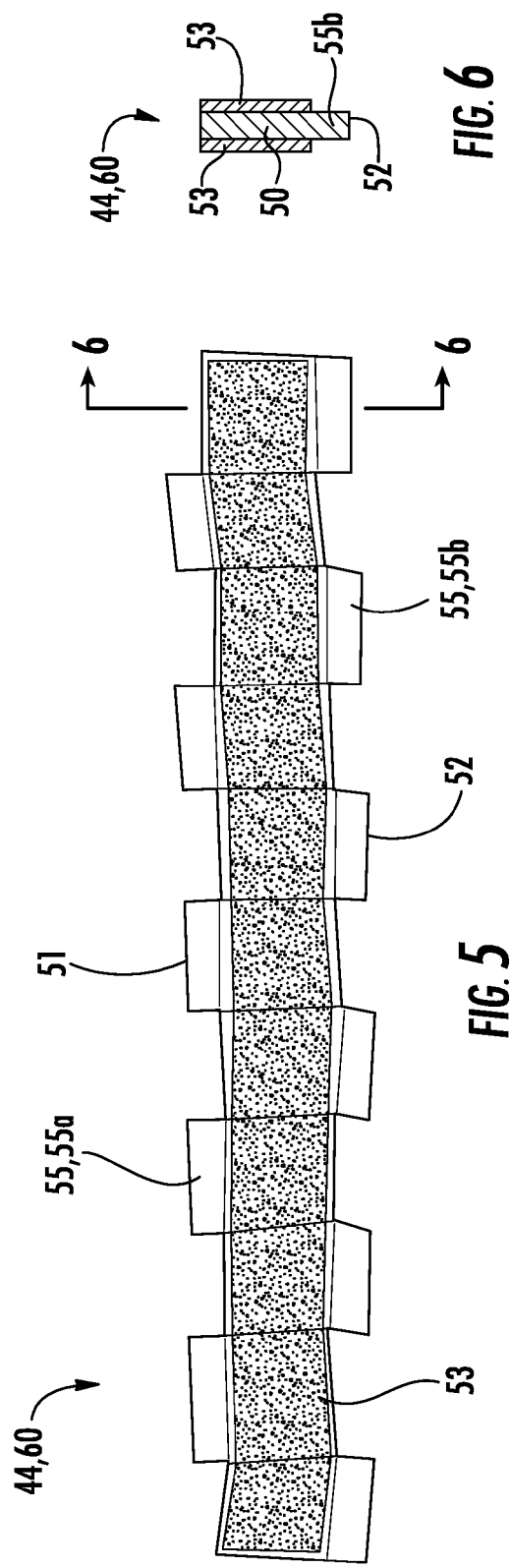
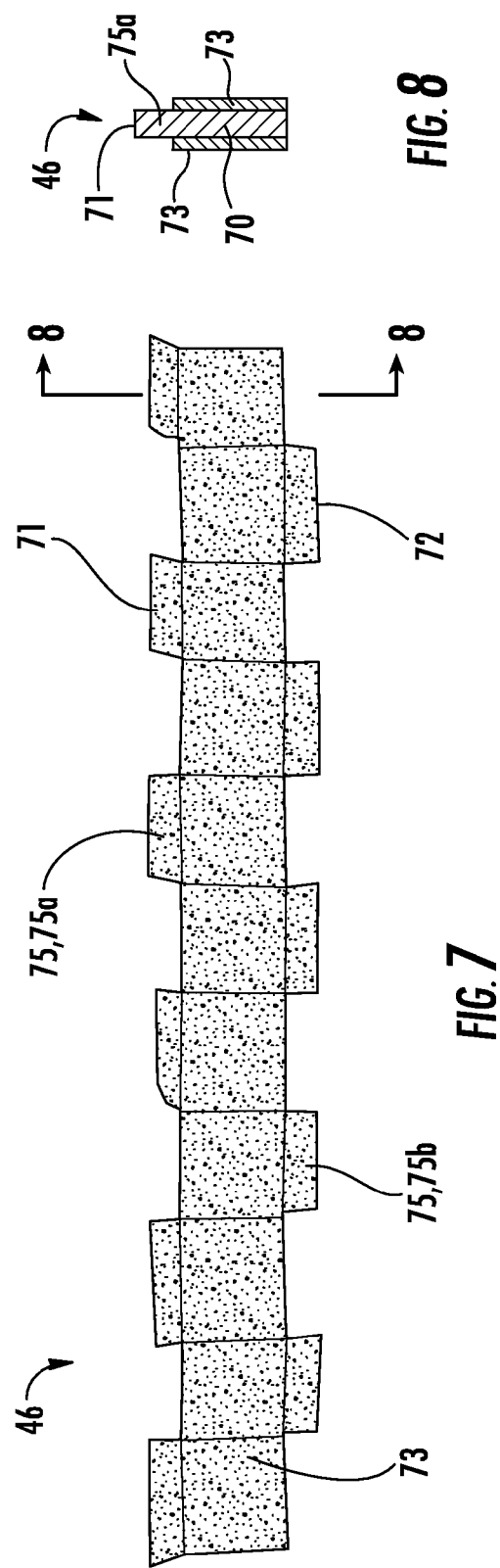

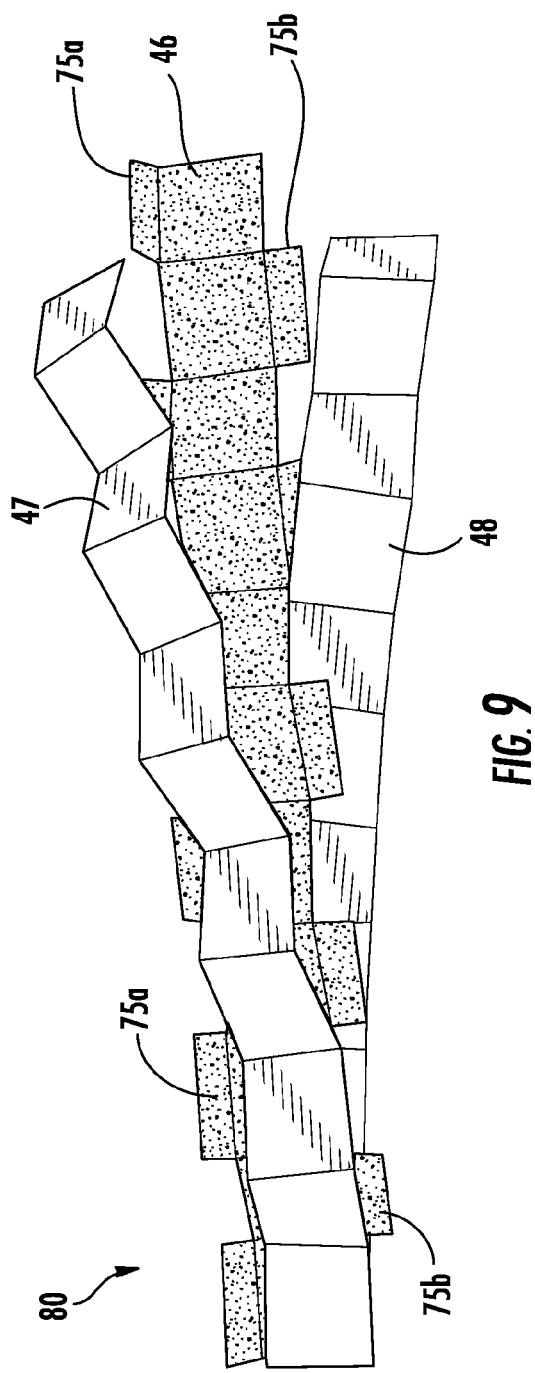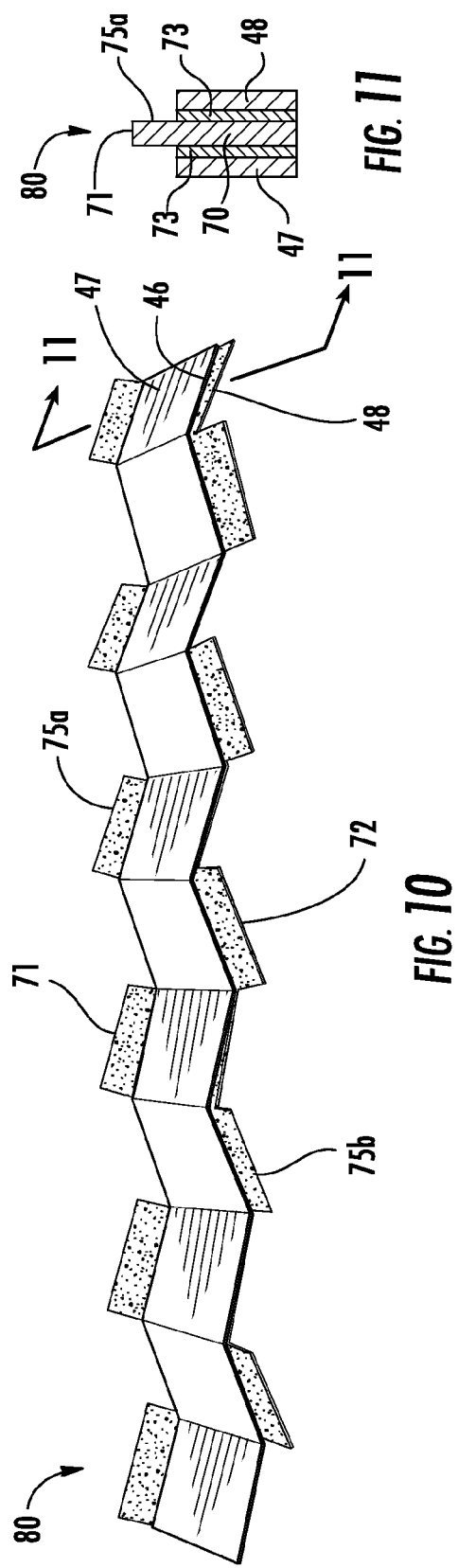

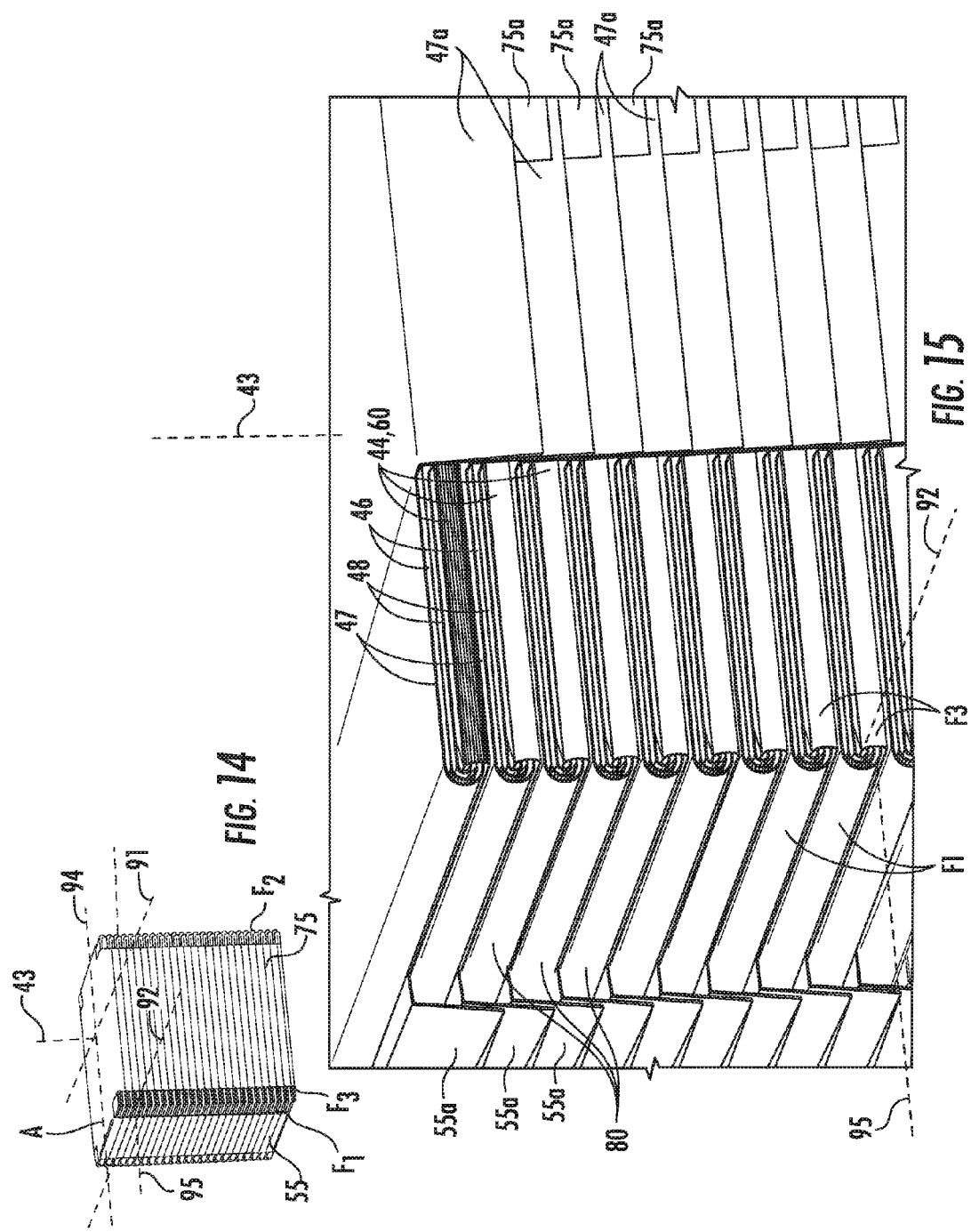

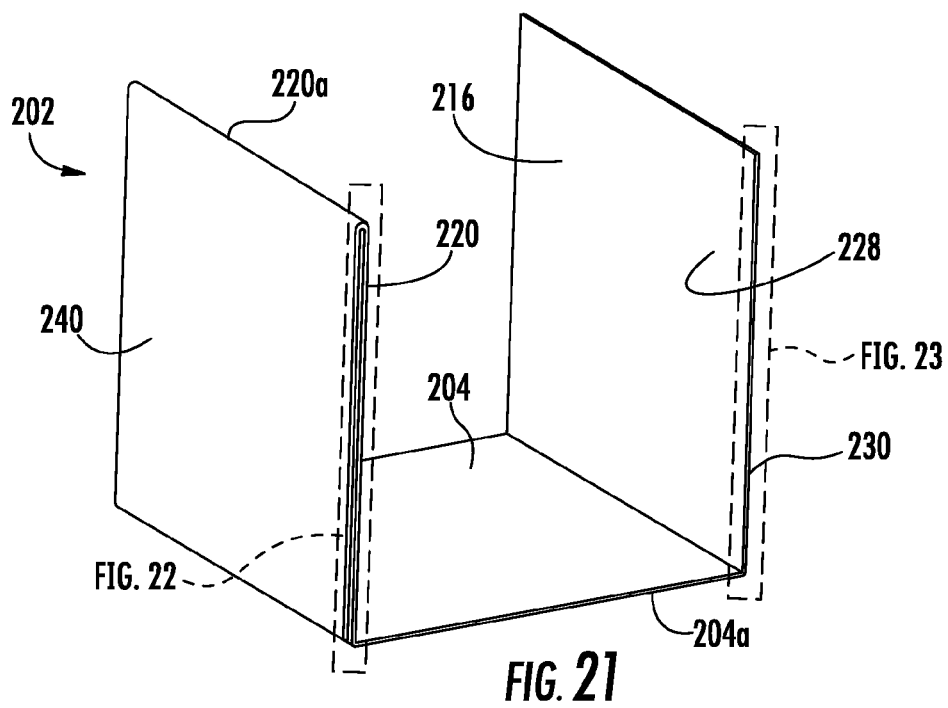
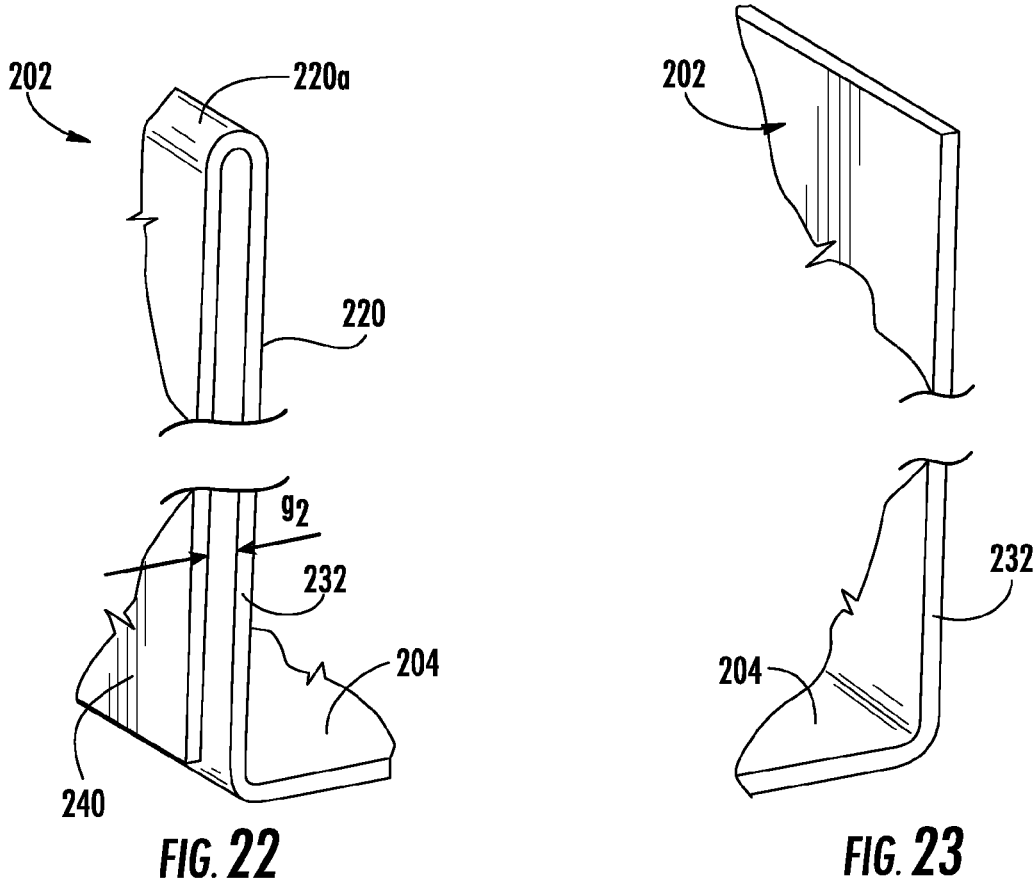

CURRENT COLLECTORS

BACKGROUND

1. Field of the Invention

The present invention relates to an electrochemical cell that includes a stacked or folded arrangement of electrode plates, and U-shaped current collectors disposed in the cell that form an electrical connection with the electrode plates, and cooperate to retain the electrode plates in a desired configuration.

2. Description of the Related Art

Battery packs provide power for various technologies ranging from portable electronics to renewable power systems and environmentally friendly vehicles. For example, hybrid electric vehicles use a battery pack and an electric motor in conjunction with a combustion engine to increase fuel efficiency. Battery packs are formed of a plurality of electrochemical cells. The cells are arranged in two or three dimensional arrays and are electrically connected in series or in parallel.

Different cell types have emerged in order to deal with the space requirements of a very wide variety of installation situations, and the most common types used in vehicles are cylindrical cells, prismatic cells, and pouch cells. Regardless of cell type, each cell includes an electrode assembly that is sealed within a cell housing along with an electrolyte to form a power generation and storage unit. The electrode assembly may include an alternating arrangement of positive and negative electrode elements separated by intermediate separator plates, and can be provided in various configurations, including a stacked arrangement of individual electrode sheets, an elongated electrode pair that is wound into a jelly-roll arrangement, or an elongated electrode pair that is z-folded to form a stacked arrangement.

The energy production volumetric efficiency of the cell, as determined by the ratio of (the volume of the electrode assembly disposed within the cell) to (the volume of the cell housing), is relatively low. For example, some cylindrical cells having a jelly-roll electrode assembly may be 80 to 90 percent volumetrically efficient, and some prismatic cells having a jelly-roll electrode assembly may be 60-75 percent volumetrically efficient. Traditionally, a prismatic or pouch type cell having a stacked arrangement of individual electrode plates can be more volumetrically efficient than one having a jelly-roll arrangement, but manufacture of the stacked arrangement is more difficult and prone to mistakes and thus more expensive than that of the jelly roll arrangement. In addition, in some pouch cells, a stack band that surrounds the stacked or folded arrangement of electrodes is used to retain the electrodes in the desired stacked and aligned configuration. In addition to the stack band, such pouch cells also include current collectors disposed in the cell housing that provide an electrical connection between electrode elements of a given polarity and a corresponding terminal. It is desirable to increase the energy production volumetric efficiency of the cell while reducing the complexity of the cell constituents.

SUMMARY

In some aspects, an electrochemical cell includes a cell housing and an electrode assembly disposed in the cell housing. The electrode assembly includes positive electrode portions alternating with negative electrode portions. The positive electrode portions and the negative electrode portions are separated by at least one separator and stacked along a stack axis. The electrochemical cell includes a first current collector that is disposed between the cell housing and the electrode assembly, and is electrically connected to one of the positive electrode portions and the negative electrode portions. The first current collector has a first base and a first pair of legs that extend in parallel from opposed ends of the first base to form a first U-shaped member. A cross-section of the first current collector includes the first base and each leg of the first pair of legs defining a first plane. In addition, the electrochemical cell includes a second current collector that is disposed between the cell housing and the electrode assembly, and is electrically connected to an other one of the positive electrode portions and the negative electrode portions. The second current collector has a second base and a second pair of legs that extend in parallel from opposed ends of the second base to form a second U-shaped member, and a cross-section of the second current collector includes the second base and each leg of the second pair of legs defining a second plane. The second plane is transverse to the first plane.

The electrochemical cell may include one or more of the following features: Each of the first base and the second base are transverse to the stack axis. Each leg of the first pair of legs and each leg of the second pair of legs pass through a common plane. Each of the first current collector and the second current collector includes an inner surface that faces the electrode stack, an outer surface opposed to the first surface, a peripheral edge surface that extends between the inner surface and the outer surface, and a terminal that protrudes from a portion of the peripheral edge surface. The terminal of the first current collector protrudes from an edge of the first base. The terminal of the first current collector is a plate that is folded along the edge of the first base so as extend in a plane that is generally transverse to planes defined by each leg of the first pair of legs. The terminal of the second current collector protrudes from a free end of one leg of the second pair of legs. The terminal of the second current collector is a plate that is folded along the free end so as to overlie the one leg. The cell housing is formed of layers of a flexible sheet material that are joined together along seal line to form a pouch, the terminal of the first current collector passes through a first portion of the seal line and between the layers of flexible sheet material so as to be disposed outside the cell housing, the second current collector passes through a second portion of the seal line and between layers of the flexible sheet material so as to be disposed outside the cell housing, and the first portion and the second portion are on opposed sides of the electrode assembly. The first current collector and the second current collector cooperate to surround all sides of the electrode assembly and maintain the positive electrode portions, the negative electrode portions and the at least one separator in a stacked configuration.

In some aspects an electrochemical cell includes a cell housing and an electrode assembly disposed in the cell housing. The electrode assembly includes positive electrode portions alternating with negative electrode portions, and the positive electrode portions and the negative electrode portions are separated by at least one separator and stacked along a stack axis. The electrochemical cell includes a first current collector that is disposed between the cell housing and the electrode assembly, and is electrically connected to one of the positive electrode portions and the negative electrode portions. The first current collector has a first base and a first pair of legs that extend in parallel from opposed ends of the first base to form a first U-shaped member. The electrochemical cell also includes a second current collector that is disposed between the cell housing and the electrode assembly. The second current collector is electrically connected to an other one of the positive electrode portions and the negative electrode portions. The second current collector has a second base and a second pair of legs that extend in parallel from opposed ends of the second base to form a second U-shaped member. The first pair of legs includes an a leg and a b leg. The a leg is disposed on first side of the electrode assembly and is electrically connected to the one of the positive electrode portions and the negative electrode portions on the first side. The b leg is disposed on a second side of the electrode assembly, where the second side is opposed to the first side. The b leg is electrically connected to the one of the positive electrode portions and the negative electrode portions on the second side of the electrode assembly. The second pair of legs includes a c leg and a d leg. The c leg is disposed on third side of the electrode assembly and is electrically connected to the other one of the positive electrode portions and the negative electrode portions on the third side. The third side adjoins the first side and the second side. The d leg is disposed on a fourth side of the electrode assembly. The fourth side is opposed to the third side, and the d leg is electrically connected to the other one of the positive electrode portions and the negative electrode portions on the fourth side of the electrode assembly.

The electrochemical cell may include one or more of the following features: Each of the first base and the second base are transverse to the stack axis. The a leg, the b leg, the c leg and the d leg pass through a common plane. Each of the first current collector and the second current collector includes an inner surface that faces the electrode stack, an outer surface opposed to the first surface, a peripheral edge surface that extends between the inner surface and the outer surface, and a terminal that protrudes from a portion of the peripheral edge surface. The terminal of the first current collector protrudes from an edge of the first base. The terminal of the first current collector is a plate that is folded along the edge of the first base so as extend in a plane that is generally transverse to planes defined by each leg of the first pair of legs. The terminal of the second current collector protrudes from a free end of one leg of the second pair of legs. The terminal of the second current collector is a plate that is folded along the free end so as to overlie the one leg. The cell housing is formed of layers of a flexible sheet material that are joined together along seal line to form a pouch, the terminal of the first current collector passes through a first portion of the seal line and between the layers of flexible sheet material so as to be disposed outside the cell housing, the second current collector passes through a second portion of the seal line and between layers of the flexible sheet material so as to be disposed outside the cell housing, and the first portion and the second portion are on opposed sides of the electrode assembly. The first current collector and the second current collector cooperate to surround all sides of the electrode assembly and maintain the positive electrode portions, the negative electrode portions and the at least one separator in a stacked configuration.

Advantageously, by providing the current collectors in a U-shaped configuration, it is possible for the current collector to perform the electrode stack restraining function previously provided by a stack band, and omit the stack band from the cell housing. Since the stack band is omitted, the number and complexity of the constituents of the cell housing, and thus the manufacturing costs, are reduced.

In some embodiments, the U-shaped current collectors can be used with electrode configurations in which tabs protrude from the electrode plates of the electrode stack, and in which tabs of differing polarity are disposed on opposite sides of the electrode stack or on adjacent sides of the electrode stack. In particular, the U-shaped current collectors directly contact and form electrical connections with tabs of the same polarity. In some embodiments, the electrical connections between the U-shaped current collectors and the tabs are weld-free. For this reason, the U-shaped current collectors can be used with various electrode stack configurations, including stacked, jelly rolled or folded.

BRIEF DESCRIPTION OF THE DRAWINGS

FIG. 5 is a perspective view of the positive (beta) electrode.

FIG. 6 is a cross-sectional view of the electrode of FIG. 5 as seen along line 6-6.

FIG. 7 is a perspective view of the negative electrode.

FIG. 8 is a cross-sectional view of the electrode of FIG. 7 as seen along line 8-8.

FIG. 9 is a perspective view of the alpha electrode in a fanned-out configuration showing the negative electrode disposed between a pair of separators.

FIG. 10 is a perspective view of the alpha electrode in a stacked configuration including the negative electrode disposed between the pair of separators.

FIG. 11 is a cross-sectional view of the electrode of FIG. 10 as seen along line 11-11.

FIG. 14 is a perspective view of the electrode assembly for use as a legend for FIG. 15.

FIG. 15 is a perspective view of the portion of the electrode assembly of FIG. 14 identified by the area A.

FIG. 21 is a perspective view of the second current collector.

FIG. 22 is an enlarged perspective view of the portion of the second current collector indicated by broken lines in FIG. 21 and referenced as FIG. 22.

FIG. 23 is an enlarged perspective view of the portion of the second current collector indicated by broken lines in FIG. 21 and referenced as FIG. 23.

DETAILED DESCRIPTION

Figure 1:
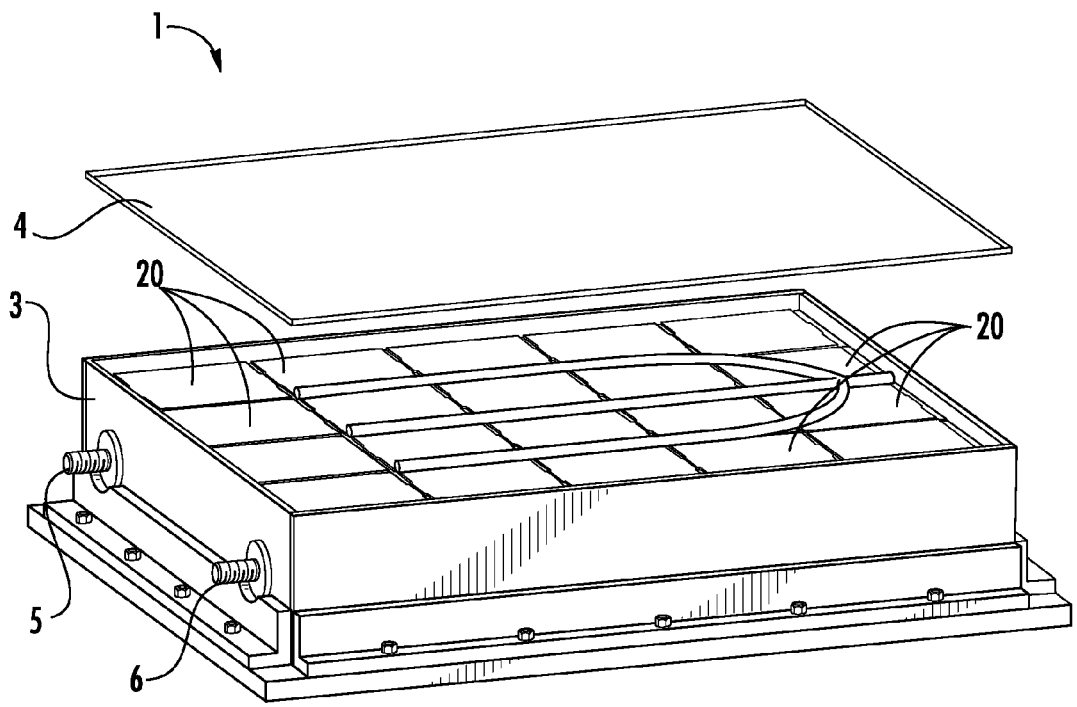
FIG. 1 is a partially exploded perspective view of a battery pack including an array of pouch cells.
Figure 2:
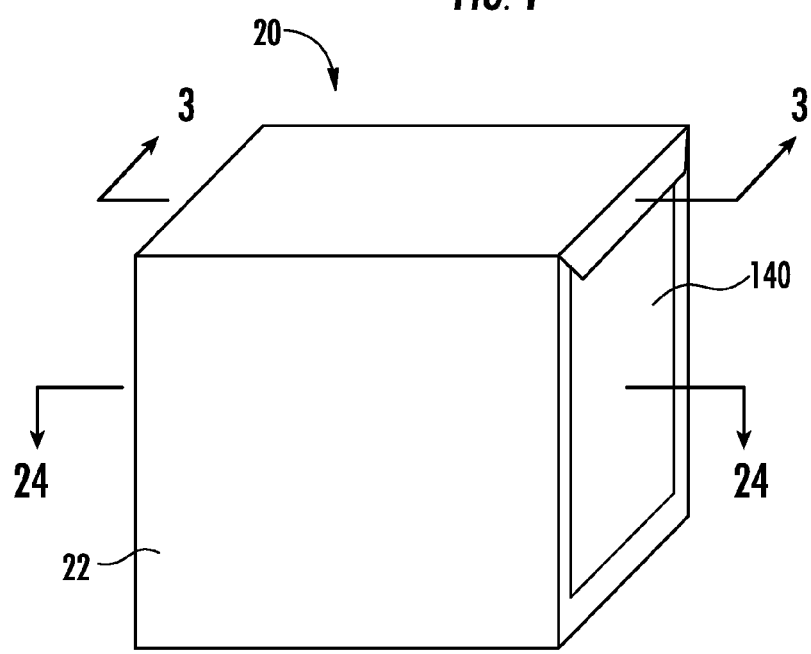
FIG. 2 is a perspective view of a pouch cell.
Figure 3:
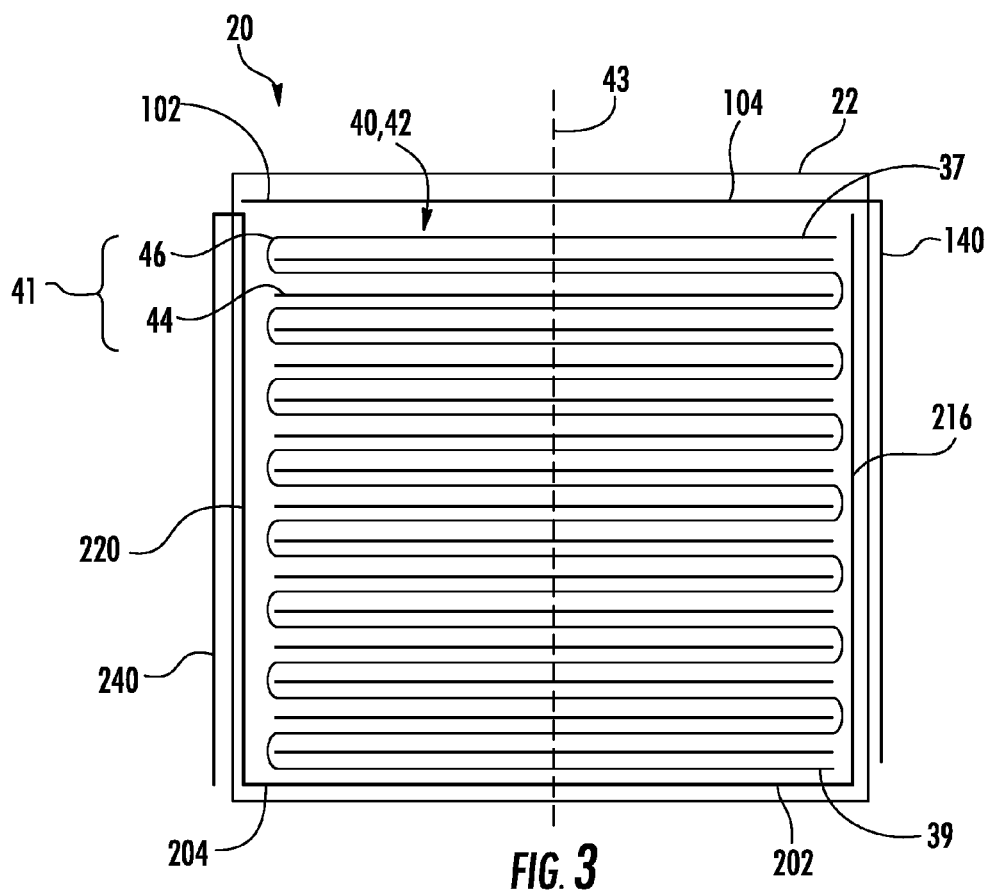
FIG. 3 is a schematic cross sectional view of the pouch cell of FIG. 2 as seen across line 3-3 of FIG. 2.
Figure 4:
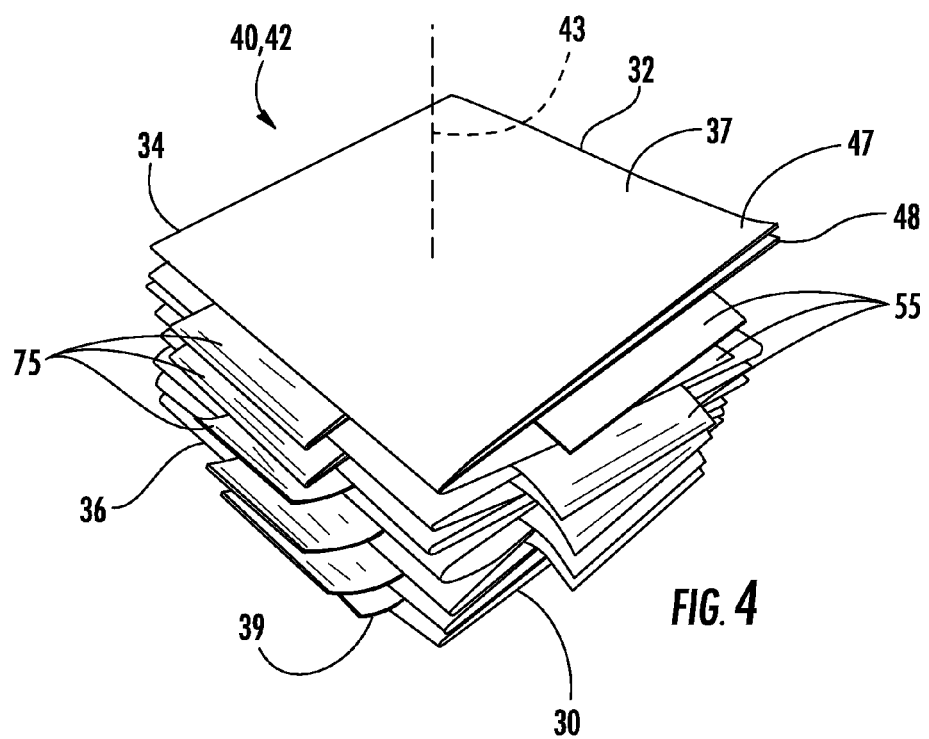
FIG. 4 is a perspective view of the electrode assembly.

Referring to FIGS. 1-4, a battery pack 1 used to provide electrical power includes an array of electrochemical cells 20 that are electrically interconnected and stored within a battery pack housing 2. The battery pack housing 2 includes a container portion 3 and a detachable lid 4. The cells 20 are lithium-ion pouch cells that include an electrode assembly 40 (FIG. 3) that is sealed within a cell housing 22 along with an electrolyte (for example, a lithium salt in an organic solvent) to form a power generation and storage unit. In some embodiments, groups of cells 20 may be bundled together to form battery modules (not shown), which in turn are stored within the battery pack housing 2. However, in the illustrated embodiment, the cells 20 are not bundled into modules and instead are directly electrically connected to battery pack housing terminals 5, 6. Within the battery pack housing 2, the cells 20 are electrically connected in series or in parallel.

Each cell 20 includes a pouch-type cell housing 22, an electrode assembly 40 that includes a folded electrode pair 41, and a pair of current collectors 102, 202. Each current collector 102, 202 forms an electrical connection with a corresponding electrode 44, 46 of the electrode pair 41. In addition, the current collectors 102, 202 cooperate to enclose the electrode assembly 40, and retain the electrode assembly 40 in desired folded and stacked configuration, as discussed in detail further below.

The cell housing 22 has a rectangular shape, and includes six orthogonal surfaces. The six surfaces together define a sealed interior space occupied by the electrode assembly 40. In the illustrated embodiment, the cell housing 21 is an assembly of two blanks of a metal laminated polymer film sheet. Each blank is folded to form the shape of an open-ended box. The first blank corresponds to a relatively deep box that serves as a container dimensioned to receive the electrode assembly 40. The second blank corresponds to a relative shallow box that serves as a cover that closes the open end of the container. A continuous sealed joint is formed along an intersection between the container and the cover to form a sealed rectangular pouch having a depth that is greater than the depth of some conventional pouch-type cell housings. For example, in some embodiments, the depth is greater than 20 mm. In the illustrated embodiment, the cell housing 22 is cube shaped and has length, width and height dimensions that are 90 mm or more.

The electrode pair 41 includes a positive electrode 44, a negative electrode 46, a first separator 47 and a second separator 48. The electrodes 44, 46 and separators 47, 48 are elongate strips of material. As used herein, the term "strip" refers to a geometry that includes a width that is large (e.g., on the order of 100 times larger) relative to the thickness, and a length that is large (e.g., on the order of 100 times larger) relative to the width. For example, in some applications, the electrodes 44, 46 may have a thickness of 0.04 mm to 0.10 mm, a width of 20 mm to 35 mm and a length of 20 m or more. Since the electrodes 44, 46 are very thin compared to the overall cell thickness (e.g. having a thickness on the order of tens or hundreds of mm), they are illustrated schematically in FIG. 3.

Referring to FIGS. 5 and 6, the positive and negative electrodes 44, 46 may each have a layered structure to facilitate insertion and/or movement of lithium-ions. For example, in the illustrated embodiment, the positive electrode 44 includes a first substrate 50 formed of a first electrically-conductive material such as copper. In addition, the positive electrode 44 includes a first active material 53 such as graphite disposed on both sides of the first substrate 50. The first active material 53 is provided along the entire length of the first substrate 50 for example in a printing process. The first active material 53 is applied such that a space exists between lengthwise edges 51, 52 of the positive electrode 44 and the first active material 53, whereby a positive clear lane of bare substrate is provided along each lengthwise edge 51, 52 of the positive electrode 44. The positive clear lanes are periodically notched (e.g., cut away) whereby positive tabs 55 are formed along the lengthwise edges 51, 52 of the positive electrode 44 between adjacent notches. The positive tabs 55 are electrically conductive and free of active material. In addition, the positive tabs 55a on one lengthwise edge 51 are offset along the length direction from the positive tabs 55b of the opposed lengthwise edge 52.

Referring to FIGS. 7 and 8, the negative electrode 46 includes a second substrate 70 formed of a second electrically-conductive material such as aluminium. In addition, the negative electrode 46 includes a second active material 73 such as a lithiated metal oxide coating disposed on both sides of the second substrate 70. The second active material 73 is provided along the entire length of the second substrate 70 for example in a printing process. The second active material 73 is applied such that a space exists between lengthwise edges 71, 72 of the negative electrode 46 and the second active material 73, whereby a negative clear lane of bare substrate is provided along each lengthwise edge 71, 72 of the negative electrode 43. The negative clear lanes are periodically notched whereby negative tabs 75 are formed along the lengthwise edges 71, 72 of the negative electrode 46 between adjacent notches. The negative tabs 75 are electrically conductive and free of active material 73. The negative tabs 75a on one lengthwise edge 71 are offset along the length direction from the negative tabs 75b of the opposed lengthwise edge 72.

Referring to FIGS. 9-11, the first and second separators 47, 48 are each a permeable membrane that functions to keep the positive and negative electrodes 44, 46 apart to prevent electrical short circuits while also allowing passage of ionic charge carriers provided in the electrolyte and that are needed to close the circuit during the passage of current within the cell 20. The first and second separators 47, 48 are formed of an electrically insulating material such as a tri-layer polypropylene-polyethylene-polypropylene membrane.

One of the positive electrode 44 and the negative electrode 46 is disposed between the first and second separators 47, 48 so as to be arranged in a layered configuration in which the electrode is sandwiched between the separators 47, 48 and forms a subassembly referred to hereafter as the alpha electrode 80. In the illustrated embodiment, the negative electrode 46 is disposed between the first and second separators 47, 48 and constitutes the alpha electrode 80 along with the first and second separators 47, 48. The other one of the positive electrode 44 and the negative electrode 46 is not disposed between separators (e.g., is separator free), and is referred to hereafter as the beta electrode 60. In the illustrated embodiment, the positive electrode 44 constitutes the beta electrode 60.

Like the positive and negative electrodes 44, 46, the alpha electrode 80 and the beta electrode 60 each have a thin, elongated shape and include a lengthwise dimension corresponding to the direction of elongation, a width dimension in a direction perpendicular to, and smaller than, the lengthwise dimension, and a thickness dimension in a direction perpendicular to both the lengthwise and width dimensions, the thickness dimension being smaller than the width dimension. In the alpha electrode 80, the tabs 75 of the negative electrode 46 protrude beyond the first separator 47 and the second separator 48 in the widthwise direction.

Figure 12:
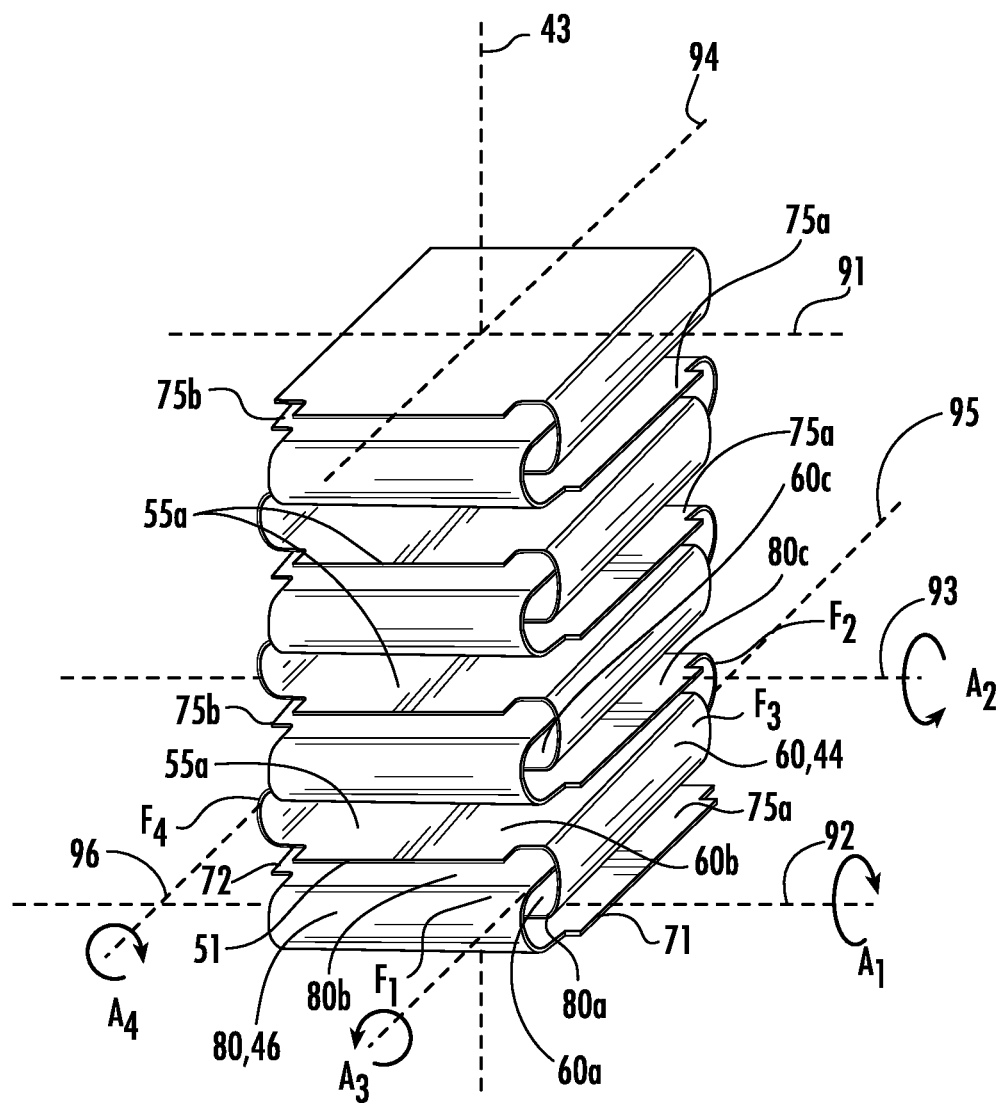
FIG. 12 is a schematic perspective view of the electrode assembly with the separators omitted for clarity.
Figure 13:
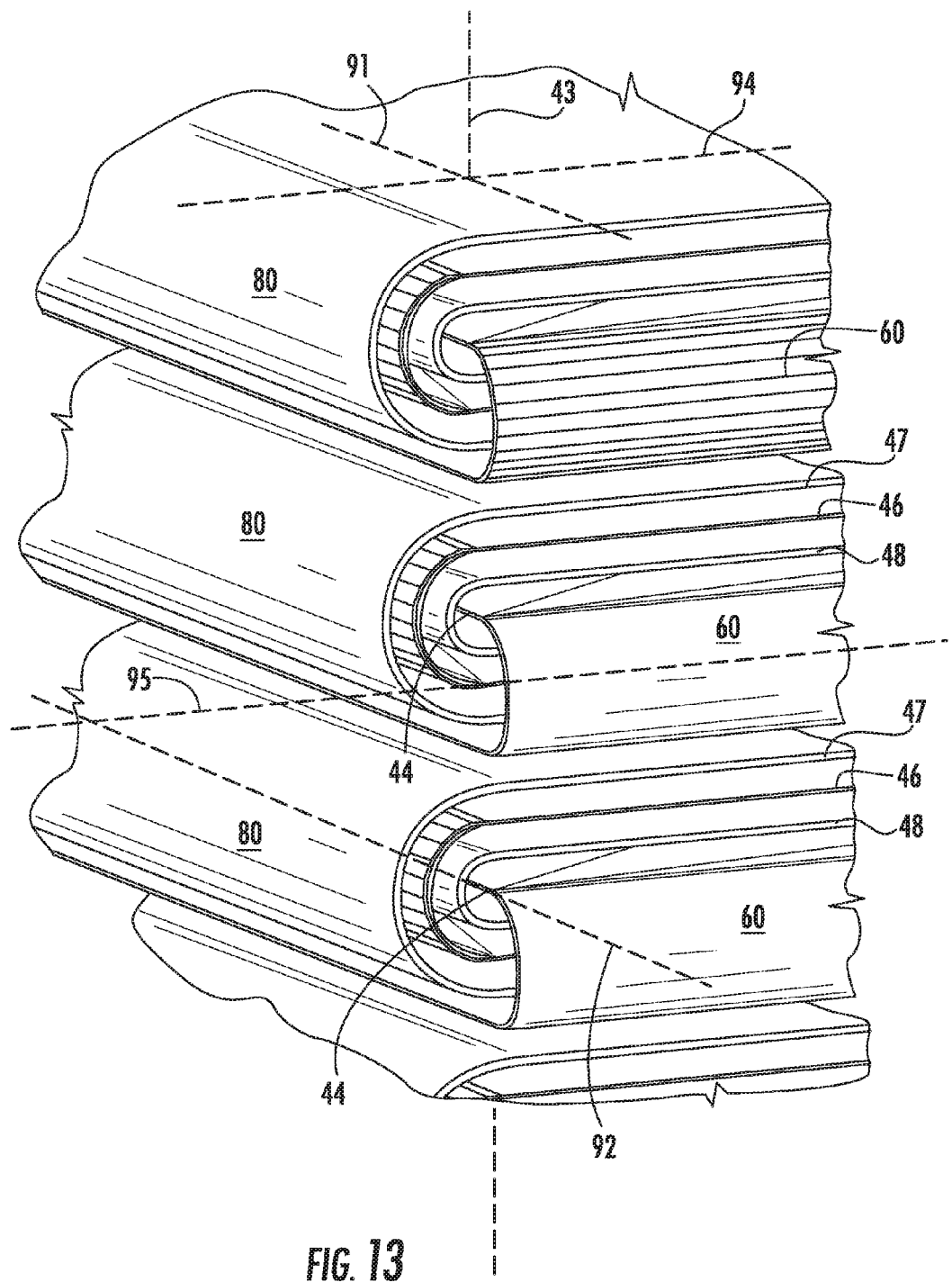
FIG. 13 is an enlarged perspective view of a corner of the electrode assembly including the separators.

Referring to FIGS. 12 and 13, the alpha electrode 80 and the beta electrode 60 are each z-folded, and are cross-woven together during the z-folding process so to form the electrode stack 42. Within the electrode stack 42, generally planar portions of the alpha electrode alternate with generally planar portions of the beta electrode 60 in a layered configuration, and a stack axis 43 of the electrode stack 42 extends through a center of the electrode stack 42 in a direction parallel to the stacking direction and perpendicular to the planar portions. Details of the cross-woven and folded configuration of the electrode assembly 40 will now be described.

The alpha electrode 80 is arranged in a continuous series of z folds. In each individual z-fold, the alpha electrode 80 is folded in a first direction A1 about an axis 92 parallel to a first fold axis 91 so that a second portion 80b of the alpha electrode 80 overlies a first portion 80a of the alpha electrode 80. The alpha electrode 80 is also folded in a second direction A2 about another axis 93 parallel to the first fold axis 91 so that a third portion 80c of the alpha electrode 80 overlies the first portion 80a of the alpha electrode 80. In the z-fold of the alpha electrode 80, the first direction A1 is opposed to the second direction A2, and the first portion 80a, the second portion 80b, and the third portion 80c of the alpha electrode 80 are arranged in a stacked configuration along the stack axis 43. The first fold axis 91 is perpendicular to the lengthwise edges 71, 72 of the negative electrode 46 and extends in the width direction of the negative electrode 46. In addition, the resulting folds F1, F2 in the alpha electrode about the axes 92, 93 are made at a location between adjacent pairs of opposed tabs 75a, 75b.

Like the alpha electrode 80, the beta electrode is 60 arranged in a continuous series of z folds. In each z-fold, the beta electrode 60 is folded in a third direction A3 about an axis 95 parallel to a second fold axis 94 so that a second portion 60b of the beta electrode 60 overlies a first portion 60a of the beta electrode 60. The beta electrode 60 is also folded in a fourth direction A4 about another axis 96 parallel to the second fold axis 94 so that a third portion 60c of the beta electrode 60 overlies the first portion 60a of the beta electrode 60. In the z-fold of the beta electrode 60, the third direction A3 is opposed to the fourth direction A4, and the second fold axis 94 is perpendicular to both the first fold axis 91 and the stack axis 43. The second fold axis 94 is perpendicular to the lengthwise edges 51, 52 of the positive electrode 44 and extends in the width direction of the positive electrode 44. In addition, the resulting folds F3, F4 in the beta electrode 60 about the axes 95, 96 are made at a location between adjacent pairs of opposed tabs 55a, 55b.

Prior to z-folding, the alpha and beta electrodes 80, 60 are arranged so that the lengthwise edges 51, 52 of the beta electrode 60 are perpendicular to the lengthwise edges 71, 72 of the alpha electrode 80, and the first portions 80a, 60a of each electrode 80, 60 are stacked. The alpha and beta electrodes 80, 60 so arranged are z-folded simultaneously in cross directions such that a z folds of the alpha electrode 80 are interwoven with the z folds of the beta electrode 60, and such that the first, second and third portions 60a, 60b, 60c of the beta electrode 60 are stacked along the stack axis 43 so as to alternate with the first, second and third portions 80a, 80b, 80c of the alpha electrode 80. That is, the first portion 60a of the beta electrode 60 is layered between the first and second portions 80a, 80b of the alpha electrode 80, the second portion 60b of the beta electrode 60 is layered between the second and third portions 80b, 80c of the alpha electrode 80, and the third portion 60c of the beta electrode 60 overlies the third portion 80c of the alpha electrode 80.

In this configuration, the tabs 55a, 55b, 75a, 75b are positioned between the respective folds F1, F2, F3, F4. The positive tabs 55a corresponding to one lengthwise edge 51 of the positive electrode 44 are disposed on an opposed side of the electrode stack 42 from the positive tabs 55b of the opposed lengthwise edge 52. In addition, the negative tabs 75a on one lengthwise edge 71 of the negative electrode 46 are disposed on an opposed side of the electrode stack 42 from the negative tabs 75b of the opposed lengthwise edge 72, and on an adjacent side of the electrode stack 42 from the positive tabs 55a, 55b.

Referring also to FIGS. 14 and 15, in some embodiments, the tabs 55a, 55b, 75a, 75b are folded over the corresponding side of the electrode stack 42 so as to overlie the side of the electrode stack 42. Due to the stacked and layered configuration of the electrode portions within the electrode stack 42, the folded tabs on a given side of the electrode stack 42 overlie each other and are slightly offset along the direction of the stack axis 43, and thus have the appearance of louvers. For example, as seen in FIG. 15, the positive tabs 55a overlie the folds F1 and each other on one side of the electrode stack 42, and the negative tabs 75a overlie the folds F3 and each other along an adjacent (orthogonal) side of the electrode stack 42. The tabs 55a, 55b, 75a, 75b are used to form electrical connections with the current collectors 102, 202 as discussed below. In order to ensure that the folded negative tabs 75a, 75b are prevented from contacting the beta (positive) electrode 60 in the vicinity of the fold F3, the first and second separators 47, 48 may also include tabs 47a, 48a. Only tab 47a is seen in the view of FIG. 15, and the tab 48a corresponding to the second separator 48 underlies tab 47a and thus is hidden from view. The negative tab 75a is provided in sufficient length to protrude beyond the separator tabs 47a, 48a, whereby the negative tabs 75 can form an electrical connection for example with a current collector 202 (discussed below).

The electrode assembly 40 in the z-folded and cross-woven stacked arrangement has a volumetric efficiency that is comparable to the volumetric efficiency of some electrode assemblies including a stacked arrangement of individual electrode plates, but is easier to manufacture and less prone to defects due to the continuous nature of the cross-woven z folding process.

Figure 17:
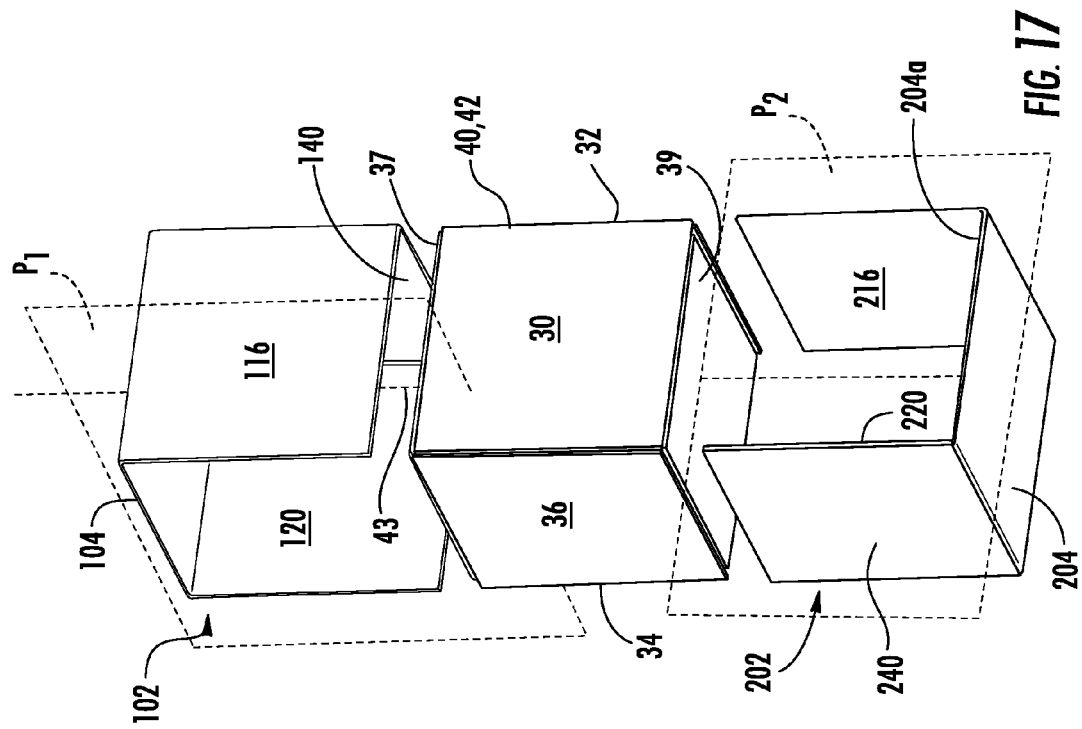
FIG. 17 is an exploded perspective view of the positive and negative current collectors and the electrode assembly.
Figure 16:
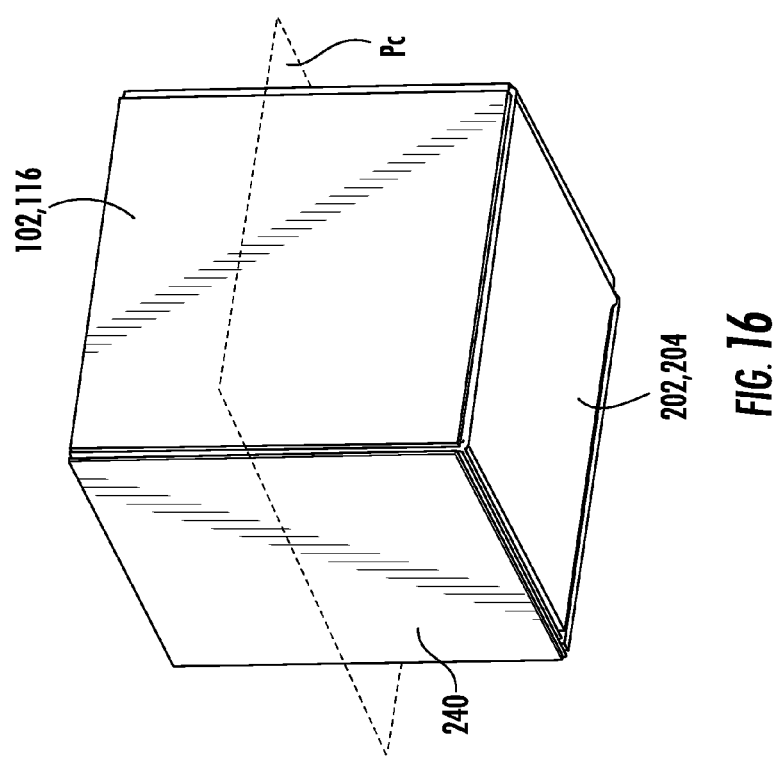
FIG. 16 is a perspective view of the positive and negative current collectors in an assembled configuration and enclosing the electrode assembly.
Figure 18:
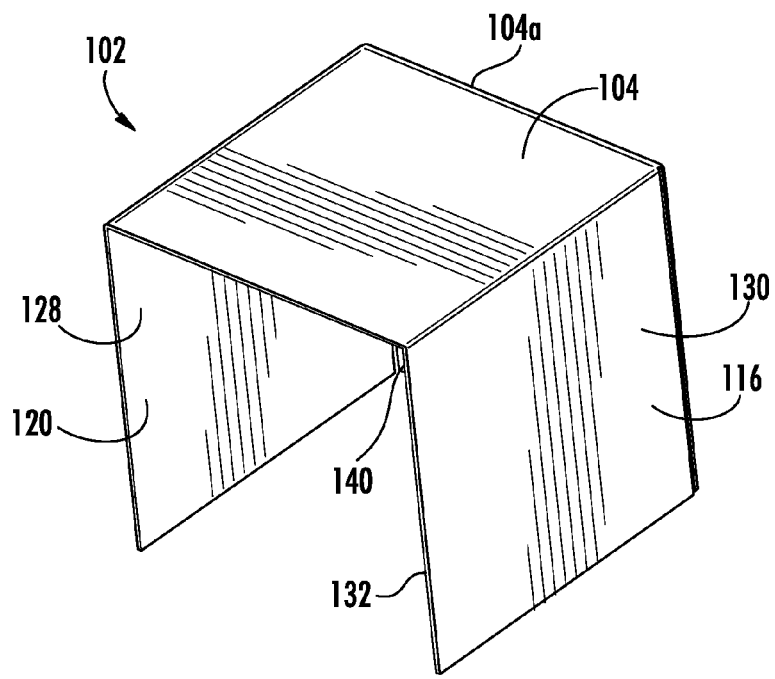
FIG. 18 is a perspective view of the first current collector.
Figure 19:
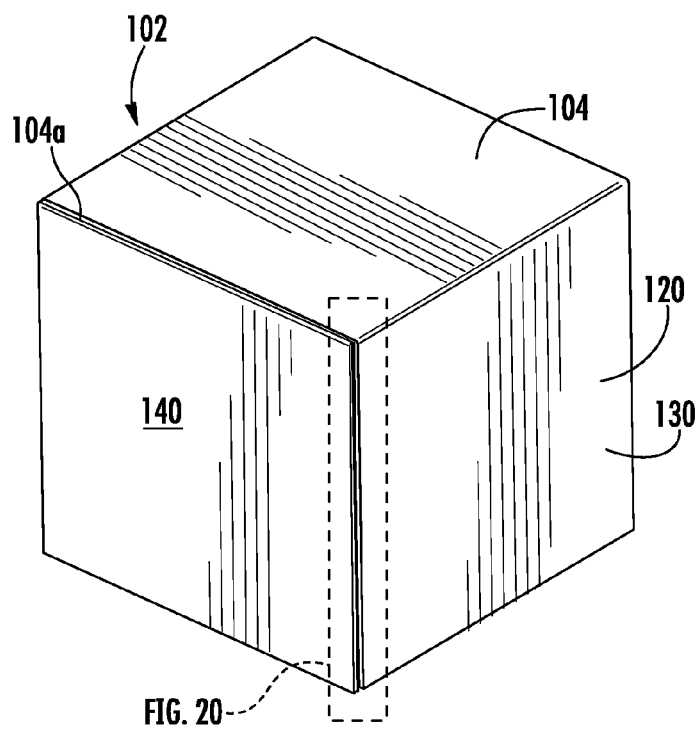
FIG. 19 is a perspective view of the first current collector as seen from an opposed side relative to the view of FIG. 18.

Referring to FIGS. 16 and 17, the resulting electrode stack 42 is generally rectangular in shape, and includes a first end 37 and a second end 39 that is opposed to the first end 37. The first and second ends 37, 39 are transverse to the stack axis 43. The electrode stack 42 includes four sides 30, 32, 34, 36 that extend between the first and second ends 37, 39, including a first side 30, a second side 32 that is adjacent to the first side 30, a third side 34 that is opposed to the first side 30 and adjacent to the second side 32, and a fourth side 36 that is opposed to the second side 32 and adjacent to the first and third sides 30, 34. In the illustrated embodiment, the positive electrode tabs 55a are disposed on the electrode stack first side 30 and the positive electrode tabs 55b are disposed on the electrode stack third side 34. In addition, the negative electrode tabs 75a are disposed on the electrode stack second side 32 and the negative electrode tabs 75b are disposed on the electrode stack fourth side 36.

The first current collector 102 is electrically connected to one or more of the positive tabs 55 of the positive electrode 44. The first current collector 102 is disposed between the cell housing 22 and the electrode assembly 40, and is configured to direct current to a positive terminal 140 disposed on the outside of the cell housing 22. In addition, the cell 20 further includes a second current collector 202 that is electrically connected to one or more of the negative tabs 75 of the negative electrode 46. The second current collector 202 is disposed between the cell housing 22 and the electrode assembly 40, and is configured to direct current to a negative terminal 240 disposed on the outside of the cell housing 22.

Referring to FIGS. 17-20, the first current collector 102 and the second current collector 202 are similar in that each is formed from an electrically conductive sheet arranged into a general U-shape, but there are differences between the first current collector 102 and the second current collector 202, as will now be described.

The first current collector 102 has a first base 104 and a first pair of legs 116, 120 that extend in parallel from opposed ends of the first base 104 to form the U-shaped structure. The first pair of legs includes an a leg 116 and a b leg 120. A cross-section of the first current collector 102 that includes the first base 104 and each leg 116, 120 of the first pair of legs and is parallel to an edge 104a of the base 104 defines a first plane P1 (shown in broken lines in FIG. 17). When assembled with the electrode assembly 40, the a leg 116 is disposed on the first side 30 of the electrode stack 42 and is electrically connected to the positive tabs 55a of the positive electrode 44 on the stack first side 30. The b leg 120 is disposed on the opposed, third side 34 of the electrode stack 42. The b leg 120 is electrically connected to the positive tabs 55b of the positive electrode 44 on the stack third side 34. In addition, an inner surface 128 of the first current collector 102 faces the electrode stack 42, and an outer surface 130, which is opposed to the inner surface 128, faces the cell housing 22. The first current collector 102 is oriented relative to the electrode stack 42 such that the first base 104 is transverse to the stack axis 43 and overlies the stack first end 37.

Figure 20:
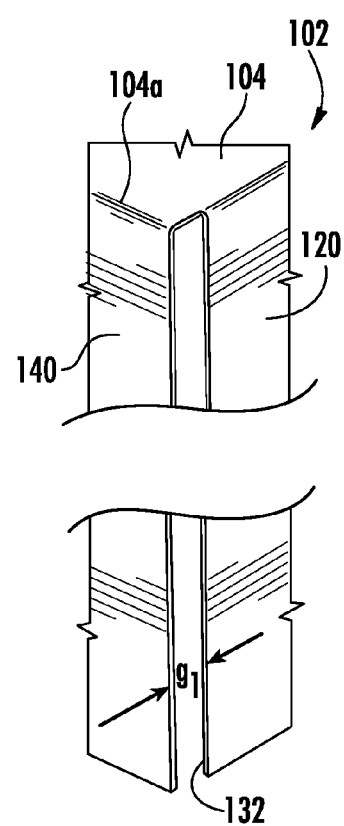
FIG. 20 is an enlarged perspective view of the portion of the first current collector indicated by broken lines in FIG. 19 and referenced as FIG. 20.

The first current collector includes a peripheral edge surface 132 that extends between the inner surface 128 and the outer surface 130, and a terminal 140 (e.g., the positive terminal) protrudes from a portion of the peripheral edge surface 132. In particular, the positive terminal 140 protrudes from an edge 104a of the first base 104. The positive terminal 140 is a plate having a width that corresponds to the distance between the a leg 116 and the b leg 120. The positive terminal 140 is folded along the edge 104a of the first base 104 so as extend in a plane that is parallel to the stack axis 43 and generally transverse to planes defined by each leg 116, 120 of the first pair of legs. The first base 104 is dimensioned so that a gap g1 exists between each leg 116, 120 and the inner surface of the positive terminal 140 (FIG. 20). In use, the positive terminal 140 exits the cell housing 22 by passing between the sheets that form the cell housing 22 and through the sealed joint the joins the sheets, and due to the folded configuration of the positive terminal 140, overlies an outer surface of one side of the cell housing 22. The gap g1 is dimensioned to receive the side of the cell housing 22 therein.

Referring to FIGS. 17 and 21-24, the second current collector 202 has a second base 204 and a second pair of legs 216, 220 that extend in parallel from opposed ends of the second base 204 to form the U-shaped structure. The second pair of legs includes a c leg 216 and a d leg 220. A cross-section of the second current collector 202 that includes the second base 204 and each leg 216, 220 of the second pair of legs and is parallel to an edge 204a of the base 204 defines a second plane P2 (shown in broken lines in FIG. 17). When assembled with the electrode assembly 40, the c leg 216 is disposed on the second side 32 of the electrode stack 42 and is electrically connected to the negative tabs 75a of the negative electrode 46 on the stack second side 32. The d leg 220 is disposed on the opposed, fourth side 36 of the electrode stack 42. The d leg 220 is electrically connected to the negative tabs 75b of the negative electrode 46 on the stack fourth side 36. In addition, an inner surface 228 of the second current collector 202 faces the electrode stack 42, and an outer surface 230, which is opposed to the inner surface 228, faces the cell housing 22. The second current collector 202 is oriented relative to the electrode stack 42 such that the second base 204 is transverse to the stack axis 43 and overlies the stack second end 39.

The second current collector 202 includes a peripheral edge surface 232 that extends between the inner surface 228 and the outer surface 230, and a terminal 240 (e.g., the negative terminal) protrudes from a portion of the peripheral edge surface 232. In particular, the negative terminal 240 protrudes from a free end 220a of the d leg 220. The negative terminal 240 is a plate having a width that corresponds to a width of the d leg 220, and is folded along the d leg free end 220a so as to overlie the outer surface of the d leg 220. As a result, the negative terminal 240 extends in a plane that is generally parallel to planes defined by each leg 216, 220 of the second pair of legs. The fold is configured so that a gap g2 exists between an outer surface of the d leg 220 and the inner surface of the negative terminal 240 (FIG. 22). In use, the negative terminal 240 exits the cell housing 22 by passing between the sheets that form the cell housing 22 and through the sealed joint the joins the sheets, and due to the folded configuration of the negative terminal 220, overlies an outer surface of one side of the cell housing 22. The gap g2 is dimensioned to receive the side of the cell housing 22 therein. In the illustrated embodiment, the negative terminal 240 and the positive terminal 140 are disposed on opposed sides of the cell housing 22.

Figure 24:
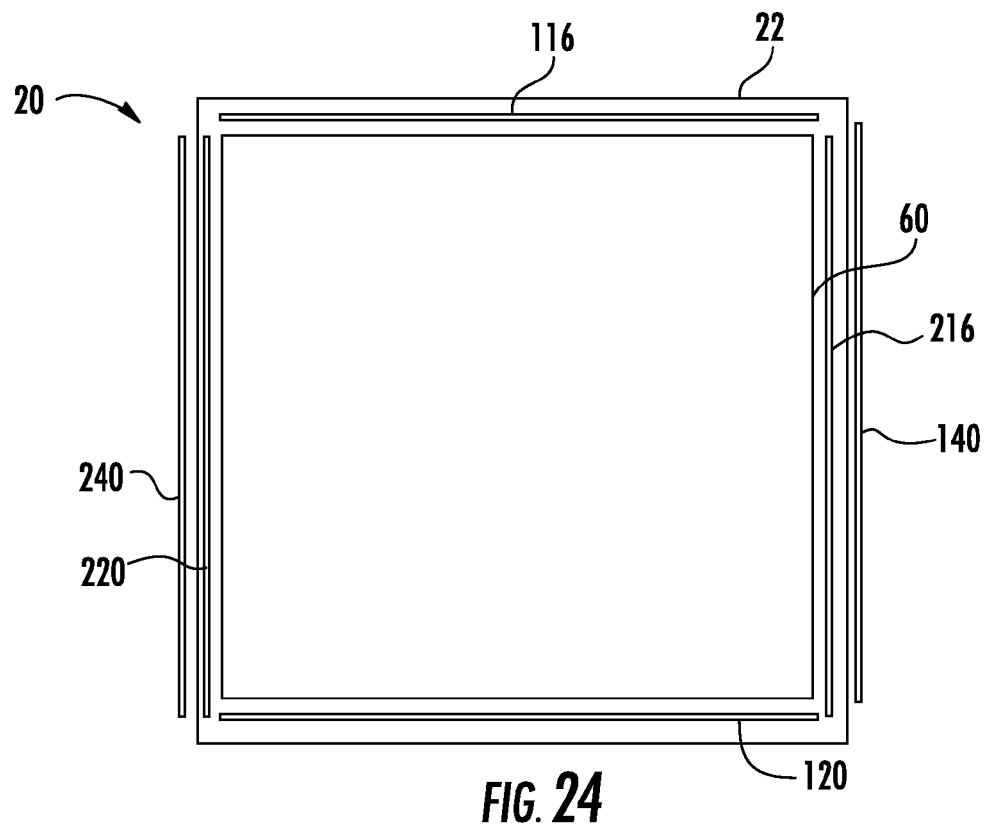
FIG. 24 is a schematic cross sectional view of the pouch cell of FIG. 2 as seen across line 24-24 of FIG. 2, where the cross-section corresponds to a plan view of a common plane Pc.

By providing the current collectors 102, 202 in a U-shaped configuration, and arranging them about the electrode assembly 40 so that the current collector bases 104, 204 are on opposed sides of the electrode stack 42 and the current collectors 102, 202 open facing each other, the electrode stack 42 is retained in the desired configuration without requiring a separate stack restraint. In this configuration, the first plane P1 is transverse to the second plane P2 (FIG. 17), and the legs 116, 120 of the first current collector 102 and the legs 216, 220 of the second current collector 202 each pass through a common plane Pc (shown in broken lines in FIG. 16) that is disposed between, and parallel to, the first and second bases 104, 204 (FIG. 24). As a result, the first current collector 102 and the second current collector 202 cooperate to surround all sides 30, 32, 34, 36, 37, 39 of the electrode assembly 40 and to maintain the positive electrode portions 60a, 60b, 60c, the negative electrode portions 80a, 80b, 80c and the separators 47, 48 in the stacked configuration described above.

In the illustrated embodiments, the U-shaped current collectors 102, 202 each include a terminal 140, 240 that protrudes from a peripheral edge surface 132, 232 thereof. The terminal 140, 240 is positioned on the corresponding current collector 102, 202 so as to place the terminal 140, 240 at the first end 37 of the electrode assembly 40 and thus to locate the terminal 140, 240 near the continuous sealed joint used join the sheets that form the pouch-type cell housing 22. This terminal position facilitates passage of the terminal 140, 240 between the sheets and through the sealed joint.

Figure 25:
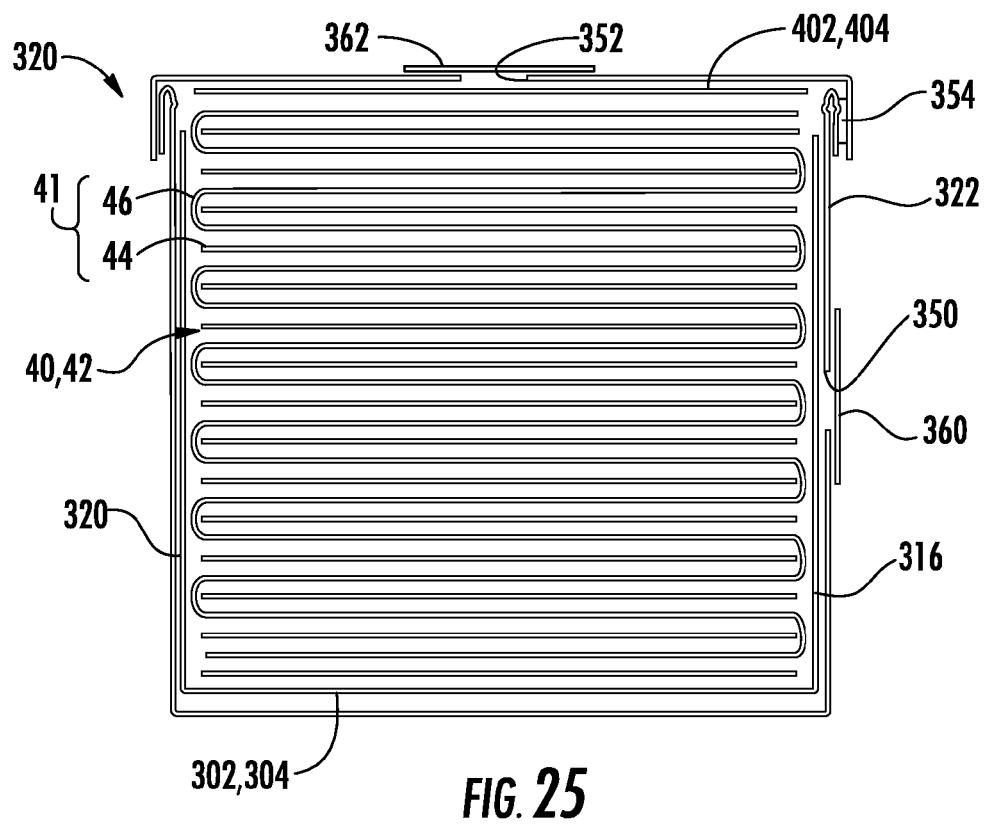
FIG. 25 is a schematic cross sectional view of an alternative embodiment pouch cell corresponding to the view shown in FIG. 3.

Referring to FIG. 25, alternative embodiments are contemplated in which U-shaped current collectors 302, 402 are formed without the terminals 140, 240. In such alternative embodiments, the current collectors 302, 402 each have a pure U-shape (e.g., have three generally planar portions arranged in a U configuration without additional protrusions or folded portions). For example, an electrochemical pouch cell 320 includes a first U-shaped current collector 302 and a second U-shaped current collector 402. The first current collector 302 has a first base 304 and a first pair of legs 316, 320 that extend in parallel from opposed ends of the first base 304, and the second current collector 402 has a second base 404 and a second pair of legs 416, 420 (not seen in the view illustrated in FIG. 25) that extend in parallel from opposed ends of the second base 404. Each current collector 302, 402 passes current from the inside of the cell 320 to an outside of the cell 320 via an opening 350, 352 in the cell housing 322 at a location spaced apart from the sealed joint 354. The opening 350, 352 is located on side of the cell housing 322 overlying the corresponding current collector 302, 402, regardless of whether it overlies a base 304, 404 or leg 316, 320, 416, 420. Thus, the opening 350, 352 can be located on a side or end of the cell housing 322. Moreover, any one of the base 304, 404 and legs 316, 320, 416, 420 of the U-shape can be used to pass current through the corresponding opening 350, 352 to an external structure such as an external terminal plate 360, 362, for example by directly contacting the terminal plate 360, 362 via the opening. For example, in the illustrated embodiment, a leg 316 of the first current collector 302 directly contacts and passes current to a first terminal 360 via a first opening 350, and the base 404 of the second current collector 402 directly contacts and passes current to a second terminal 362 via a second opening 352. Although "direct contact" is not illustrated in FIG. 25 due to the schematic nature of this figure, direct contact is possible due to the relative thinness of the respective components, and/or due to an applied external force which urges the current collector and terminal plate together.

Although the alpha electrode 80 described herein includes the negative electrode 46 sandwiched between a pair of separators 47, 48, and the beta electrode 60 includes the positive electrode 44 that is free of separators, the electrode assembly 40 is not limited to this configuration. For example, in some embodiments, the alpha electrode 80 includes the positive electrode 44 sandwiched between the pair of separators 47, 48, and the beta electrode 60 includes the negative electrode 46 that is free of separators. In other embodiments, alpha electrode 80 includes the positive electrode 44 sandwiched between the pair of separators 47, 48, and the beta electrode 60 includes the negative electrode 46 sandwiched between a second pair of separators (not shown).

Although the positive and negative electrodes 44, 46 are described as having tabs 55, 75 formed along each lengthwise edge, the positive and negative electrodes 44, 46 are not limited to this configuration. For example, in some embodiments, the positive and/or negative electrodes 60, 80 have tabs 55, 75 formed along one lengthwise edge, and the opposed lengthwise edge is free of tabs 55, 75. In this example, the active material may be deposited on the electrode surface up to the tab-free lengthwise edge, providing increased productivity and thus a more volumetrically efficient cell.

Although exemplary materials have been described for use in forming the positive electrode 44 including the first substrate 50 and first active material 53, the negative electrode 46 including the second substrate 70 and second active material 73, and the separators 47, 48, it is contemplated that other materials may be used, and that the materials used to form the positive electrode 44, the negative electrode 46, and/0 the separators 47, 48 will be determined by the requirements of the specific application.

In the illustrated embodiment, the electrodes provided as an elongated electrode pair arranged in a z-folded and cross-woven configuration. It is contemplated, however, that the U-shaped current collectors 102, 202 can be used with other electrode configurations, including a stacked arrangement of individual electrode sheets, an elongated electrode pair that is wound into a jelly-roll arrangement, or an elongated electrode pair that is z-folded.

Although the first current collector 102 is described as having the positive terminal 140 formed along the first base 104, and second current collector 202 is described as having the negative terminal 240 formed along the free end 220a of the d leg 220, the first and second current collectors 102, 202 are not limited to this configuration. For example, in some embodiments, the first current collector 102 has the positive terminal 140 formed along a free end of one of the legs 116, 120, and the second current collector 202 has the negative terminal 240 formed along the second base 204.

In the illustrated embodiment, the positive terminal 140 has a width corresponding to the distance between the a leg 116 and the b leg 120, and the negative terminal 240 has a width corresponding to a width of the d leg 220. This relatively wide width advantageously provides a terminal that covers most of a side of the pouch cell 20, maximizing the electrical connection area of the terminal. However, it is contemplated that the widths of the positive and negative terminals 140, 240 may be smaller than those shown in the illustrated embodiment. For example, the width of the positive terminal 140 may be in a range of 1 to 99 percent of the distance between the a leg 116 and the b leg 120, and the width of the negative terminal may be in a range of 1 to 99 percent of the width of the d leg 220.

Although the cell housing 21 is described herein as being a pouch cell housing formed of a metal laminated film, the cell housing 21 is not limited to this material or configuration. For example, the cell housing 21 may be formed of other materials and/or may be formed having a prismatic, cylindrical or other configuration.

Although the cells 20 are described herein as being lithium-ion cells, they are not limited to this type of cell chemistry. For example, is some embodiments, the cells 20 may be nickel-cadmium, nickel-metal-hydride, lead-acid or other type of cell chemistry.

Selective illustrative embodiments of the battery cell and current collectors are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery cell and current collectors been described above, the battery cell and/or current collectors are not limited to the working example described above, but various design alterations may be carried out without departing from the devices as set forth in the claims.

What is claimed is:

1. An electrochemical cell comprising
a cell housing;
an electrode assembly disposed in the cell housing, the electrode assembly including positive electrode portions alternating with negative electrode portions, the positive electrode portions and the negative electrode portions being separated by at least one separator and stacked along a stack axis,
a first current collector that is disposed between the cell housing and the electrode assembly, and is electrically connected to one of the positive electrode portions and the negative electrode portions, the first current collector having a first base and a first pair of legs that extend in parallel from opposed ends of the first base to form a first U-shaped member, a cross-section of the first current collector including the first base and each leg of the first pair of legs defining a first plane, and
a second current collector that is disposed between the cell housing and the electrode assembly, and is electrically connected to an other one of the positive electrode portions and the negative electrode portions, the second current collector having a second base and a second pair of legs that extend in parallel from opposed ends of the second base to form a second U-shaped member, a cross-section of the second current collector including the second base and each leg of the second pair of legs defining a second plane, and the second plane is transverse to the first plane.

2. The electrochemical cell of claim 1, wherein each of the first base and the second base are transverse to the stack axis.

3. The electrochemical cell of claim 1, wherein each leg of the first pair of legs and each leg of the second pair of legs pass through a common plane.

4. The electrochemical cell of claim 1, wherein each of the first current collector and the second current collector includes
an inner surface that faces the electrode stack,
an outer surface opposed to the first surface,
a peripheral edge surface that extends between the inner surface and the outer surface, and
a terminal that protrudes from a portion of the peripheral edge surface.

5. The electrochemical cell of claim 4, wherein the terminal of the first current collector protrudes from an edge of the first base.

6. The electrochemical cell of claim 5, wherein the terminal of the first current collector is a plate that is folded along the edge of the first base so as extend in a plane that is generally transverse to planes defined by each leg of the first pair of legs.

7. The electrochemical cell of claim 4, wherein the terminal of the second current collector protrudes from a free end of one leg of the second pair of legs.

8. The electrochemical cell of claim 7, wherein the terminal of the second current collector is a plate that is folded along the free end so as to overlie the one leg.

9. The electrochemical cell of claim 4, wherein
the cell housing is formed of layers of a flexible sheet material that are joined together along seal line to form a pouch,
the terminal of the first current collector passes through a first portion of the seal line and between the layers of flexible sheet material so as to be disposed outside the cell housing,
the second current collector passes through a second portion of the seal line and between layers of the flexible sheet material so as to be disposed outside the cell housing, and
the first portion and the second portion are on opposed sides of the electrode assembly.

10. The electrochemical cell of claim 1, wherein the first current collector and the second current collector cooperate to surround all sides of the electrode assembly and maintain the positive electrode portions, the negative electrode portions and the at least one separator in a stacked configuration.

11. An electrochemical cell comprising
a cell housing;
an electrode assembly disposed in the cell housing, the electrode assembly including positive electrode portions alternating with negative electrode portions, the positive electrode portions and the negative electrode portions being separated by at least one separator and stacked along a stack axis,
a first current collector that is disposed between the cell housing and the electrode assembly, and is electrically connected to one of the positive electrode portions and the negative electrode portions, the first current collector having a first base and a first pair of legs that extend in parallel from opposed ends of the first base to form a first U-shaped member, and
a second current collector that is disposed between the cell housing and the electrode assembly, and is electrically connected to an other one of the positive electrode portions and the negative electrode portions, the second current collector having a second base and a second pair of legs that extend in parallel from opposed ends of the second base to form a second U-shaped member,
the first pair of legs includes an a leg and a b leg,
the a leg is disposed on first side of the electrode assembly and is electrically connected to the one of the positive electrode portions and the negative electrode portions on the first side,
the b leg is disposed on a second side of the electrode assembly, the second side being opposed to the first side,
the b leg is electrically connected to the one of the positive electrode portions and the negative electrode portions on the second side of the electrode assembly,
the second pair of legs includes a c leg and a d leg,
the c leg is disposed on third side of the electrode assembly and is electrically connected to the other one of the positive electrode portions and the negative electrode portions on the third side, the third side adjoining the first side and the second side,
the d leg is disposed on a fourth side of the electrode assembly, the fourth side being opposed to the third side, and
the d leg is electrically connected to the other one of the positive electrode portions and the negative electrode portions on the fourth side of the electrode assembly.

12. The electrochemical cell of claim 11, wherein each of the first base and the second base are transverse to the stack axis.

13. The electrochemical cell of claim 11, wherein the a leg, the b leg, the c leg and the d leg pass through a common plane.

14. The electrochemical cell of claim 11, wherein each of the first current collector and the second current collector includes
an inner surface that faces the electrode stack,
an outer surface opposed to the first surface,
a peripheral edge surface that extends between the inner surface and the outer surface, and
a terminal that protrudes from a portion of the peripheral edge surface.

15. The electrochemical cell of claim 14, wherein the terminal of the first current collector protrudes from an edge of the first base.

16. The electrochemical cell of claim 15, wherein the terminal of the first current collector is a plate that is folded along the edge of the first base so as extend in a plane that is generally transverse to planes defined by each leg of the first pair of legs.

17. The electrochemical cell of claim 14, wherein the terminal of the second current collector protrudes from a free end of one leg of the second pair of legs.

18. The electrochemical cell of claim 17, wherein the terminal of the second current collector is a plate that is folded along the free end so as to overlie the one leg.

19. The electrochemical cell of claim 11, wherein
the cell housing is formed of layers of a flexible sheet material that are joined together along seal line to form a pouch,
the terminal of the first current collector passes through a first portion of the seal line and between the layers of flexible sheet material so as to be disposed outside the cell housing,
the second current collector passes through a second portion of the seal line and between layers of the flexible sheet material so as to be disposed outside the cell housing, and
the first portion and the second portion are on opposed sides of the electrode assembly.

20. The electrochemical cell of claim 14, wherein the first current collector and the second current collector cooperate to surround all sides of the electrode assembly and maintain the positive electrode portions, the negative electrode portions and the at least one separator in a stacked configuration.

* * * * *